US008867681B2

(12) United States Patent
Yoshida

(10) Patent No.: US 8,867,681 B2
(45) Date of Patent: Oct. 21, 2014

(54) TRANSMISSION SYSTEM, TRANSMISSION DEVICE, AND CLOCK SYNCHRONIZATION METHOD

(75) Inventor: Hiroshi Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 13/248,215

(22) Filed: Sep. 29, 2011

(65) Prior Publication Data

US 2012/0082191 A1    Apr. 5, 2012

(30) Foreign Application Priority Data

Oct. 1, 2010  (JP) .................................. 2010-224272

(51) Int. Cl.
*H04L 7/00* (2006.01)
*G06F 1/12* (2006.01)
*H04J 3/06* (2006.01)

(52) U.S. Cl.
CPC *G06F 1/12* (2013.01); *H04J 3/0685* (2013.01)
USPC ........... 375/356; 375/354; 375/355; 375/219; 375/362; 375/295; 375/365; 375/368; 327/141; 327/145; 327/144; 370/503; 370/350; 370/509; 370/324; 370/498; 370/400; 370/512; 370/510; 713/400; 713/600; 713/500; 713/375

(58) Field of Classification Search
CPC ..... H04J 3/0638; H04J 3/0685; H04J 3/0697; H04J 3/0644; H04L 7/0008; H04L 7/00; H04L 2012/5674; H04L 27/2655; H04L 7/0012; H04L 12/422; H04L 45/44; H04B 1/38; H04W 56/00; H04W 56/001

USPC ......... 375/354, 356, 355, 375, 295, 306, 219, 375/362, 365, 368; 370/350, 503, 509, 510, 370/512, 514, 324, 498, 400; 713/400, 500, 713/600, 375; 455/101; 327/141, 145, 144
See application file for complete search history.

(56) References Cited

U.S. PATENT DOCUMENTS 7,791,394 B2    9/2010   Schmid et al.
7,865,756 B2 *  1/2011   Oh ................................ 713/400

FOREIGN PATENT DOCUMENTS

JP    2008-507050 A    3/2008

* cited by examiner

*Primary Examiner* — Rahel Guarino
(74) *Attorney, Agent, or Firm* — Staas & Halsey LLP

(57) ABSTRACT

A transmission system which couples a plurality of transmission devices to a control device includes a first transmission device which is one of the plurality of transmission devices; a first calculation circuit which calculates a first difference value indicating a frequency difference value between a common clock supplied from the control device and a first clock as a clock used in the first transmission device; and a transmitter which reports the first difference value to a second transmission device other than the first transmission device, wherein the second transmission device comprises: a second calculation circuit which calculates a second difference value indicating a frequency difference value between the common clock and a second clock used in the second transmission device, and a frequency controller which controls an oscillator generating the second clock so that the second difference value approaches the first difference value reported from the first transmission device.

6 Claims, 8 Drawing Sheets

TRANSMISSION SYSTEM, TRANSMISSION DEVICE, AND CLOCK SYNCHRONIZATION METHOD

CROSS-REFERENCE TO RELATED APPLICATIONS

This application is based upon and claims the benefit of priority from the prior Japanese Patent Application No. 2010-224272 filed on Oct. 1, 2010, the entire contents of which are incorporated herein by reference.

FIELD

The embodiments discussed herein are related to a transmission system, a transmission device, and a clock synchronization method.

BACKGROUND

There is a known transmission system in which a plurality of transmission devices is coupled to a control device. In the transmission system, each of the plurality of transmission devices transmits and receives data to and from an external network and also transmits and receives the data to and from another transmission device. When transmitting and receiving the data to and from the other transmission device, each of the plurality of transmission devices performs clock synchronization with the other transmission device. Therefore, generally in the transmission system, a Synchronous (SYNC) board that supplies a common clock to the plurality of transmission devices is allocated.

FIG. 8 is a diagram illustrating an example of the transmission system in which the SYNC board is allocated. In the conventional transmission system illustrated in FIG. 8, three transmission devices are coupled to the control device through a Back Wiring Board (BWB), and the SYNC board is coupled to the three transmission devices. The control device supplies the three transmission devices with various clocks for control and controls in such a way that the three transmission devices perform various processing such as alarm collecting or switching. Each of the transmission devices performs various processing according to an instruction from the control device. The SYNC board supplies the three transmission devices with the common clock. As a result, each of the three transmission devices supplied with the common clock by the SYNC board may accurately transmit and receive the data to and from the other transmission device by using the common clock. As a related art, for example, Japanese National Publication of International Patent Publication No. 2008-507050 is disclosed.

SUMMARY

According to an aspect of the invention, a transmission system which couples a plurality of transmission devices to a control device includes a first transmission device which is one of the plurality of transmission devices; a first calculation circuit which calculates a first difference value indicating a frequency difference value between a common clock supplied from the control device and a first clock as a clock used in the first transmission device; and a transmitter which reports the first difference value to a second transmission device other than the first transmission device, wherein the second transmission device comprises: a second calculation circuit which calculates a second difference value indicating a frequency difference value between the common clock and a second clock used in the second transmission device, and a frequency controller which controls an oscillator generating the second clock so that the second difference value approaches the first difference value reported from the first transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With reference to the diagrams, embodiments of a transmission system, a slave transmission device, and a clock synchronization method will be described in detail. The embodiments described below do not limit the disclosed techniques.

Figure 1:
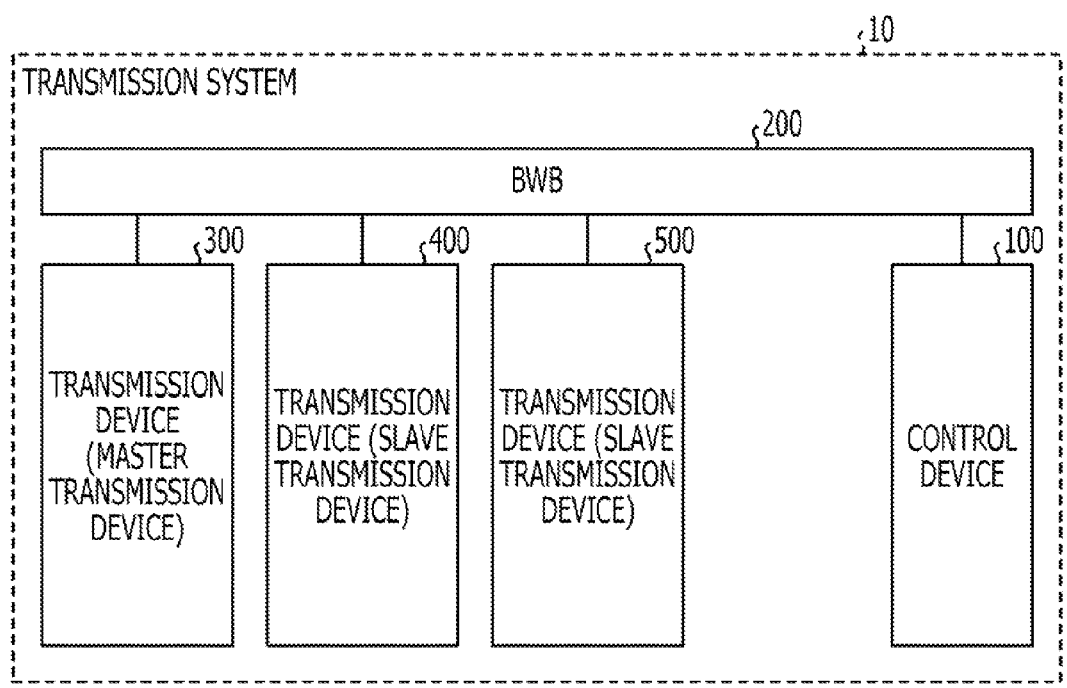
FIG. 1 is a diagram illustrating an example of a transmission system according to an embodiment.

A configuration of the transmission system according to the present embodiment will be described. FIG. 1 is a diagram illustrating an example of the transmission system according to the present embodiment. As illustrated in FIG. 1, a transmission system 10 according to the present embodiment includes a control device 100, transmission devices 300, 400, and 500 coupled to the control device 100 through a Back Wiring Board (BWB) 200. The BWB 200 is a wiring board used to transmit and receive the data among the control device 100 and the transmission devices 300, 400, and 500. The number of the transmission devices to be coupled to the control device 100 may be equal to or more than 2.

The control device 100 integrally controls the transmission devices 300, 400, and 500. The control device 100 supplies the transmission devices 300, 400, and 500 with the common clock to be used for various controls. The control device 100 performs control so that the transmission devices 300, 400, and 500 perform various processing such as alarm collecting or switching.

The transmission devices 300, 400, and 500 are interface devices that transmit and receive the data to and from the external network as well as among the transmission devices 300, 400, and 500.

Under the above-described configuration, in the transmission system 10 according to the present embodiment, to transmit and receive the data among the transmission devices 300, 400, and 500, the control device 100 sets the transmission device 300 as the master transmission device and sets the transmission devices 400 and 500 as the slave transmission devices. The transmission device 300 as the master transmission device calculates a frequency difference value (hereinafter referred to as a "first difference value") between the common clock supplied from the control device 100 and a master clock to be used in the transmission device 300. The transmission device 300 reports the calculated first difference value to the transmission devices 400 and 500 as the slave transmission devices.

On the other hand, the transmission devices 400 and 500 as the slave transmission devices calculate a frequency difference value (hereinafter referred to as a "second difference value") between the common clock supplied from the control device 100 and the slave clock to be used in the transmission devices 400 and 500. The transmission devices 400 and 500 adjust the slave clock so that the second difference value approaches the first difference value reported from the transmission device 300.

In this manner, in the transmission system 10 according to the present embodiment, the transmission devices 400 and 500 as the slave transmission devices adjust the slave clock so that the second difference value approaches the first difference value reported from the transmission device 300 as the master transmission device. As a result, in the transmission system 10 according to the present embodiment, synchronization between the master clock and the slave clock may be performed by using the existing common clock supplied from the control device 100, and the clock synchronization among the plurality of transmission devices may be performed without allocating the SYNC board.

Figure 2:
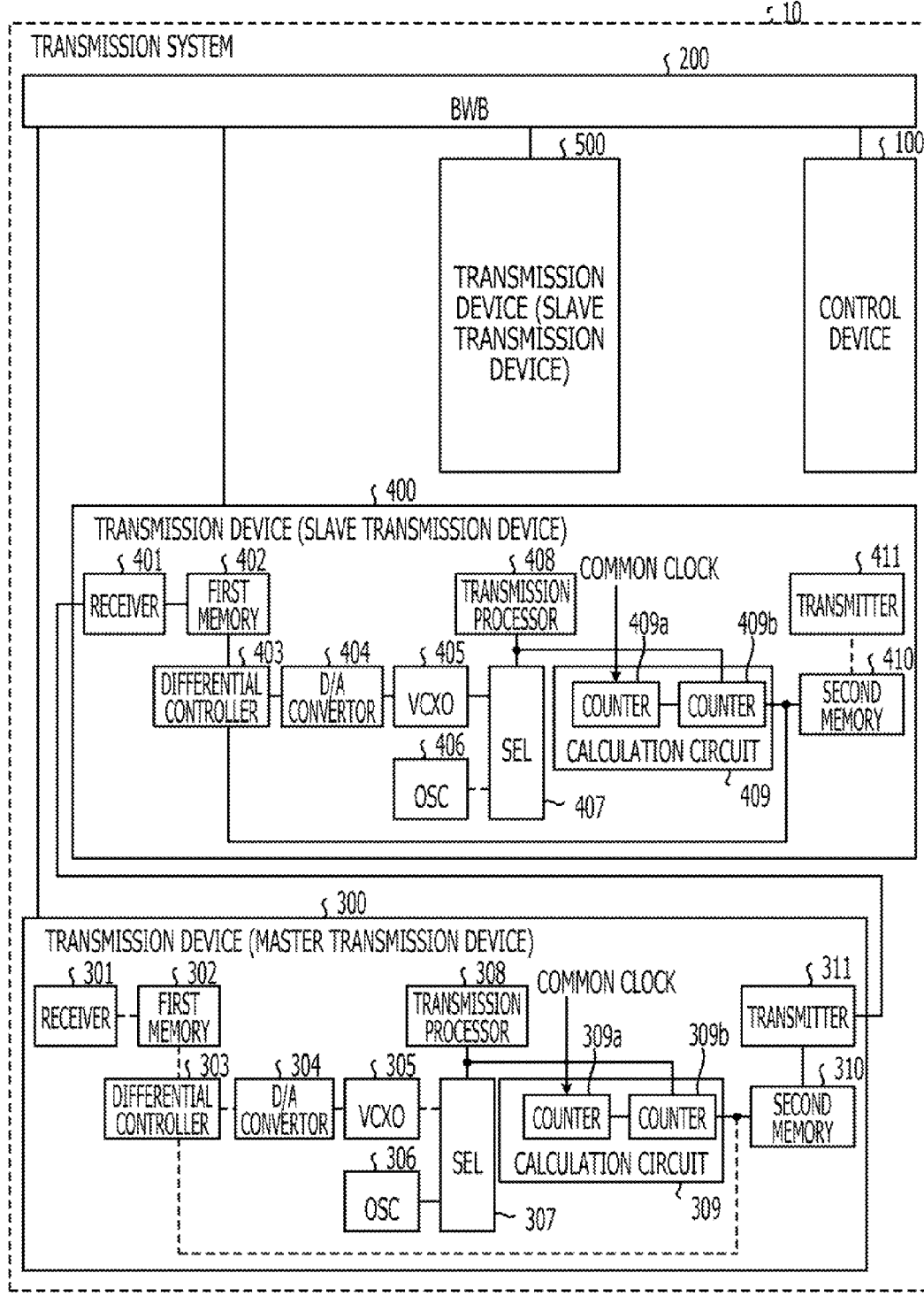
FIG. 2 is a block diagram illustrating an example of a master transmission device and a slave transmission device.

The configuration of the transmission device 300 as the master transmission device will be described. FIG. 2 is a block diagram illustrating an example of the master transmission device and the slave transmission device. As illustrated in FIG. 2, the transmission device 300 includes a receiver 301, a first memory 302, a differential controller 303, a digital/analog convertor 304, a voltage controlled crystal oscillator (VCXO) 305, and an oscillator (OSC) 306. The transmission device 300 includes a selector (SEL) 307, a transmission processor 308, a calculation circuit 309, a second memory 310, and a transmitter 311.

The receiver 301 receives the first difference value reported from the master transmission device and sends the first difference value to the first memory 302. The first memory 302 sequentially stores the first difference value received from the receiver 301. The differential controller 303 calculates the difference between the master clock and the slave clock by comparing the first difference value stored in the first memory 302 and the second difference value reported from the calculation circuit 309, and controls the VCXO 305 so that the difference is solved. The D/A convertor 304 converts the difference between the master clock and the slave clock, calculated by the differential controller 303, into an analog signal and then transmits the analog signal to the VCXO 305. The VCXO 305 generates the slave clock based on the analog signal transmitted from the D/A convertor 304 and then transmits the generated slave clock to the SEL 307.

The receiver 301, the first memory 302, the differential controller 303, the D/A convertor 304, and the VCXO 305 do not operate until master-slave relationship switching from the master transmission device to the slave transmission device is performed. Switching from the master transmission device to the slave transmission device is performed, for example, when the transmission device 300 receives a setting instruction of master-slave relationship from the control device 100.

The OSC 306 generates the clock of which the frequency is fixed. If the transmission device 300 is set as the master transmission device, the OSC 306 generates the master clock as the clock used in the transmission device 300 and then transmits the generated master clock to the SEL 307. For example, the OSC 306 generates the master clock by generating the clock of which the frequency is 78 MHz with accuracy of ±20 ppm and then transmits the generated master clock to the SEL 307.

The SEL 307 selects an output from the VCXO 305 or the output from the OSC 306 according to the instruction from the control device 100 and then transmits the output to the transmission processor 308 and the calculation circuit 309. Specifically, when receiving, from the control device 100, the instruction indicating that the transmission device 300 is set as the master transmission device, the SEL 307 selects the master clock output from the OSC 306 and then transmits the master clock to the transmission processor 308 and the calculation circuit 309. On the other hand, when receiving, from the control device 100, the instruction indicating that the control device 100 is set as the slave transmission device, the SEL 307 selects the slave clock output from the VCXO 305 and then transmits the slave clock to the transmission processor 308 and the calculation circuit 309. According to the present embodiment, the transmission device 300 is set as the master transmission device. Therefore, the SEL 307 selects the master clock output from the OSC 306 and then transmits the master clock to the transmission processor 308 and the calculation circuit 309.

The transmission processor 308 performs transmitting processing on various data by using the clock received from the SEL 307. For example, the transmission processor 308 uses the clock received from the SEL 307 to transmit and receive the data to and from the external network or the other transmission device. Furthermore, for example, by using the clock received from the SEL 307, the transmission processor 308 performs cross connect processing to distribute the data to each port.

The calculation circuit 309 calculates the first difference value that indicates the frequency difference value between the common clock supplied from the control device 100 and the master clock received from the SEL 307. The calculation circuit 309 is an example of a first calculation circuit.

Specifically, the calculation circuit 309 includes a counter 309a and a counter 309b. The counter 309a generates a ripple carry (RC) signal in a prescribed period by using the common clock supplied from the control device 100. For example, the counter 309a generates the RC signal in the period of 125 μs by using the common clock of which the frequency is 133 MHz.

The counter 309b receives the RC signal generated in the counter 309a as a load (LD) signal and then calculates the first difference value by comparing the received RC signal to the master clock received from the SEL 307 to count the number of the master clocks between the RC signals.

Figure 3:
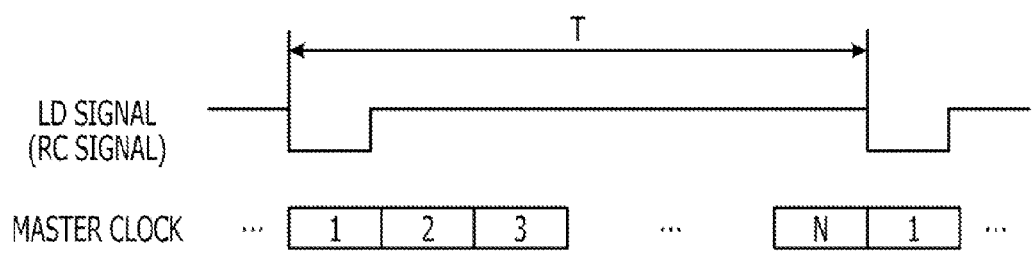
FIG. 3 is a diagram illustrating calculating processing of a first difference value.

The calculating processing of the first difference value will be described below. FIG. 3 is a diagram illustrating the calculating processing of the first difference value. As illustrated in FIG. 3, the counter 309b compares the RC signal received as an LD signal from the counter 309a to the master clock received from the SEL 307. During the period from a time when the previous RC signal is received to the time when the current RC signal is received (that is, a period T), the counter 309b calculates a first difference value N by counting the number of the master clocks received from the SEL 307. For example, the period T of the RC signal is 125 μs (1024 divide), and the frequency of the master clock is 77.76 MHz.

In this case, the counter 309b calculates the first difference value N=9953280 by counting the number of the master clocks in the period of 125 μs as $125\times10^{-6}\times1024/(1/(77.76\times10^{6}))=9953280$.

As illustrated in FIG. 2, the second memory 310 stores the first difference value calculated by the calculation circuit 309.

If the transmission device 300 is set as the master transmission device, the transmitter 311 reports the first difference value stored in the second memory 310 to the transmission devices 400 and 500 as the slave transmission devices. Specifically, the transmitter 311 transmits the digital frame, which includes the first difference value and is used to transmit and receive the data between the master transmission device and the slave transmission device, to the transmission devices 400 and 500 as the slave transmission devices.

Figure 4:
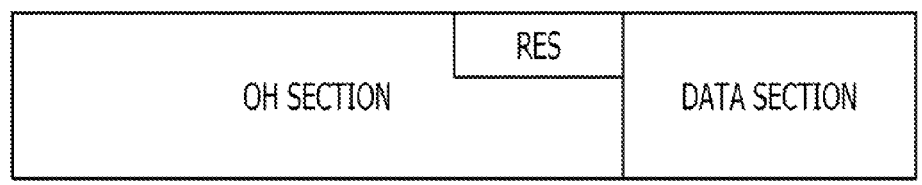
FIG. 4 is a diagram illustrating an example of a format of a digital frame.

FIG. 4 is a diagram illustrating an example of a format of the digital frame. The digital frame illustrated in FIG. 4 includes an overhead (OH) section that stores various information for operation management and a data section that stores a main signal. The transmitter 311 stores the first difference value in a reservation (RES) area as an unused area in the OH section of the digital frame illustrated in FIG. 4 and then reports the first difference value to the transmission devices 400 and 500 as the slave transmission devices.

The configuration of the transmission devices 400 and 500 as the slave transmission devices will be described below. The transmission device 400 will be described as a representative of the slave transmission device, and the description of the transmission device 500 will be omitted. As illustrated in FIG. 2, the transmission device 400 includes a receiver 401, a first memory 402, a differential controller 403, a D/A convertor 404, a VCXO 405, and an OSC 406. The transmission device 400 includes a SEL 407, a transmission processor 408, a calculation circuit 409, a second memory 410, and a transmitter 411.

The receiver 401 receives the first difference value reported from the master transmission device and then transmits the first difference value to the first memory 402. For example, when receiving the digital frame illustrated in FIG. 3 from the transmission device 300 as the master transmission device, the receiver 401 extracts the first difference value from the RES area of the OH section of the received digital frame and then transmits the first difference value to the first memory 402.

The first memory 402 sequentially stores the first difference value received from the receiver 401. Therefore, even if the transmission device as the master transmission device is removed and the report of the first difference value from the transmitter 311 of the transmission device 300 is disrupted, the first memory 402 may maintain the first difference value.

By comparing the first difference value stored in the first memory 402 to the second difference value reported from the calculation circuit 409, the differential controller 403 calculates the difference between the master clock and the slave clock, and controls the VCXO 405 so that the difference is solved. Specifically, the differential controller 403 controls the VCXO 405 to generate the slave clock so that the second difference value reported from the calculation circuit 409 approaches the first difference value stored in the first memory 402. The differential controller 403 is an example of an oscillation frequency controller. The processing performed by the differential controller 403 will be described below.

The D/A convertor 404 converts the difference between the master clock calculated by the differential controller 403 and the slave clock into an analog signal and then transmits the analog signal to the VCXO 405. The VCXO 405 generates the slave clock based on the analog signal received from the D/A convertor 404 and then transmits the generated slave clock to the SEL 407.

The OSC 406 generates the clock of which the frequency is fixed. If the transmission device 400 is set as the master transmission device, the OSC 406 generates and transmits the master clock to the SEL 407. According to the present embodiment, since the transmission device 400 is set as the slave transmission device, the OSC 406 does not operate.

According to an instruction from the control device 100, the SEL 407 selects and transmits the output from the VCXO 405 or the output from the OSC 406 to the transmission processor 408 and the calculation circuit 409. Specifically, when receiving, from the control device 100, the instruction indicating that the transmission device 400 is set as the master transmission device, the SEL 407 selects the master clock output from the OSC 406 and then transmits the master clock to the transmission processor 408 and the calculation circuit 409. On the other hand, when receiving, from the control device 100, the instruction indicating that the transmission device 400 is set as the slave transmission device, the SEL 407 selects the slave clock output from the VCXO 405 and then transmits the slave clock to the transmission processor 408 and the calculation circuit 409. According to the present embodiment, since the transmission device 400 is set as the slave transmission device, the SEL 407 selects the slave clock output from the VCXO 405 and then transmits the slave clock to the transmission processor 408 and the calculation circuit 409.

The transmission processor 408 performs the transmitting processing on various data by using the clock received from the SEL 407. For example, by using the clock received from the SEL 407, the transmission processor 408 transmits and receives the data to and from the external network or the other transmission device. Furthermore, for example, by using the clock received from the SEL 407, the transmission processor 408 performs the cross connect processing to distribute the data to each port.

The calculation circuit 409 calculates the second difference value that indicates the frequency difference value between the common clock supplied from the control device 100 and the slave clock received from the SEL 407. The calculation circuit 409 is an example of the second calculation circuit.

Specifically, the calculation circuit 409 includes a counter 409a and a counter 409b. The counter 409a generates the RC signal in a prescribed period by using the common clock supplied from the control device 100. For example, the counter 409a generates the RC signal in the period of 125 μs by using the common clock of which the frequency is 133 MHz.

The counter 409b receives the RC signal as the LD signal generated in the counter 409a. The counter 409b calculates the second difference value by comparing the received RC signal to the slave clock received from the SEL 407 to count the number of the slave clocks between the RC signals.

Figure 5:
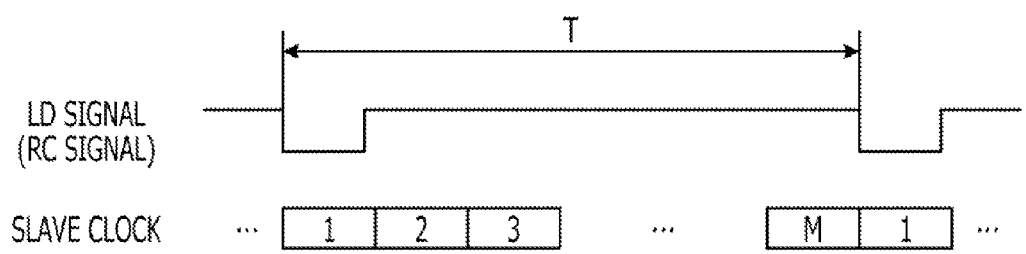
FIG. 5 is a diagram illustrating the calculating processing of a second difference value.

The calculating processing of the second difference value will be described below. FIG. 5 is a diagram illustrating the calculating processing of the second difference value. As illustrated in FIG. 5, the counter 409b compares the RC signal as the LD signal received from the counter 409a to the slave clock received from the SEL 407. During the period from the time when the previous RC signal is received to the time when the current RC signal is received (that is, the period T), the counter 409b calculates a second difference value M by counting the number of the slave clocks received from the SEL 407. For example, the period T of the RC signal is 125 μs (1024 divide), and the frequency of the slave clock is 77.76 MHz. In this case, the counter 409b calculates the second difference value M=9953280 by counting the number of the master clocks in the period of 125 μs as $125 \times 10^{-6} \times 1024/(1/(77.76 \times 10^{6}))=9953280$.

As illustrated in FIG. 2, the second memory 410 stores the second difference value calculated by the calculation circuit 409.

If the transmission device 400 is set as the master transmission device, the transmitter 411 reports the second difference value stored in the second memory 410 to the slave transmission device. According to the present embodiment, since the transmission device 400 is set as the slave transmission device, the transmitter 411 does not operate.

Figure 6:
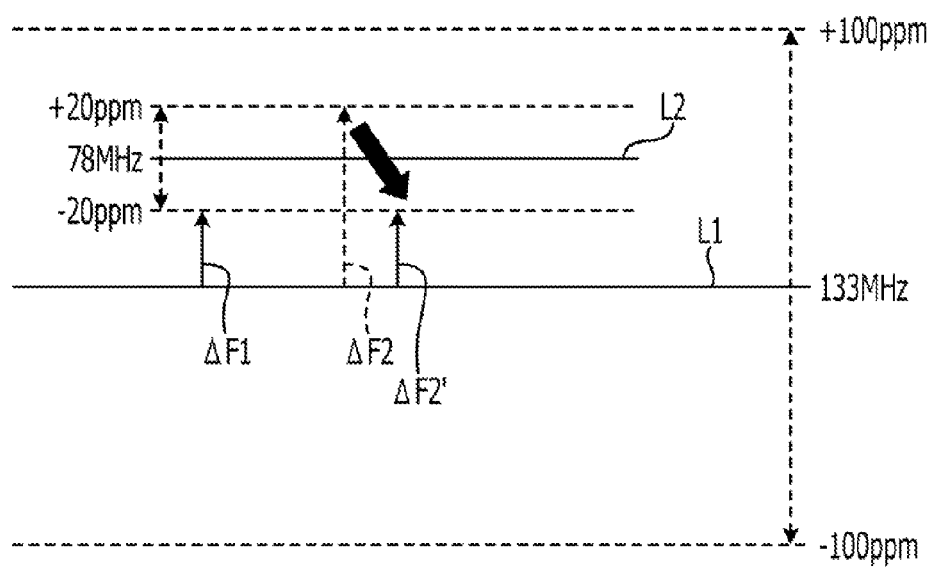
FIG. 6 is a diagram illustrating processing performed by a differential controller.

The processing performed by the differential controller 403 will be described below. FIG. 6 is a diagram illustrating the processing performed by the differential controller 403. A straight line L1 illustrated in FIG. 6 indicates the common clock of which the frequency is 133 MHz±100 ppm to be supplied from the control device 100 to the transmission devices 300, 400, and 500. A straight line L2 illustrated in FIG. 6 indicates the master clock of which the frequency is 78 MHz±20 ppm to be generated by the OSC 306 of the transmission device 300 as the master transmission device.

In the example illustrated in FIG. 6, the frequency of the master clock L2 generated by the OSC 306 of the transmission device 300 is 78 MHz-20 ppm. The first difference value reported from the transmission device 300 as the master transmission device to the transmission device 400 as the slave transmission device indicated as ΔF1 in FIG. 6. The first memory 402 stores the first difference value ΔF1. On the other hand, in the example illustrated in FIG. 6, the frequency of the slave clock generated by the VCXO 405 of the transmission device 400 is indicated as the master clock L2+20 ppm. The second difference value calculated by the calculation circuit 409 of the transmission device 400 indicated as ΔF2 in FIG. 6. The calculation circuit 409 reports the second difference value ΔF2 to the differential controller 403. The differential controller 403 controls the VCXO 405, which generates the slave clock, so that the second difference value ΔF2 reported from the calculation circuit 409 approaches the first difference value ΔF1 stored in the first memory 402. As a result, the second difference value ΔF2 is ΔF2' (=ΔF1) in FIG. 6, and the master clock in the transmission device 300 is synchronized with the slave clock in the transmission device 400 when the common clock supplied from the control device 100 is a standard. Similarly, the master clock in the transmission device 300 is synchronized with the slave clock in the transmission device 500 while the common clock supplied from the control device 100 is a standard.

Figure 7:
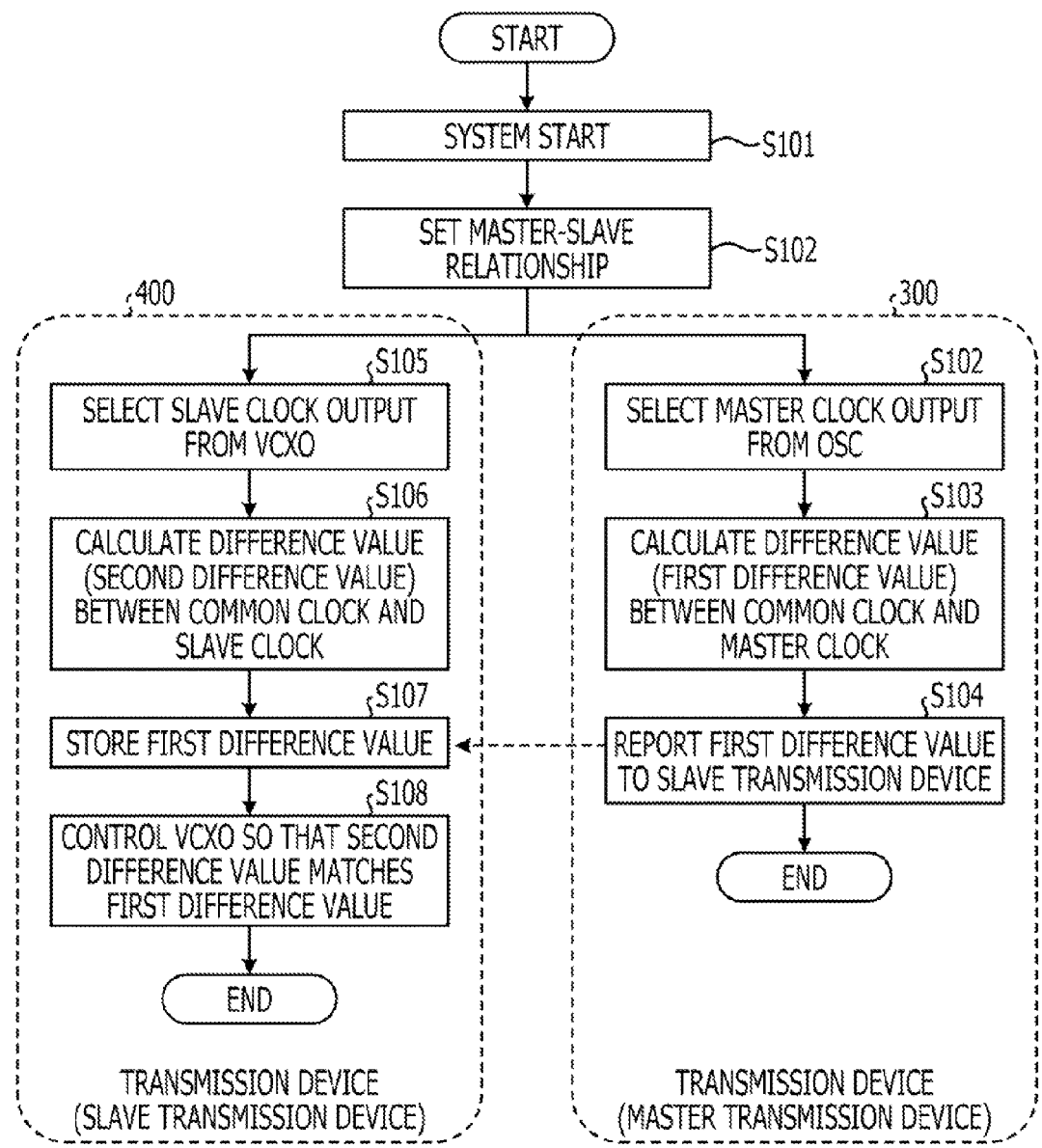
FIG. 7 is an example of a procedure of clock synchronization processing by the transmission system according to the embodiment.
Figure 8:
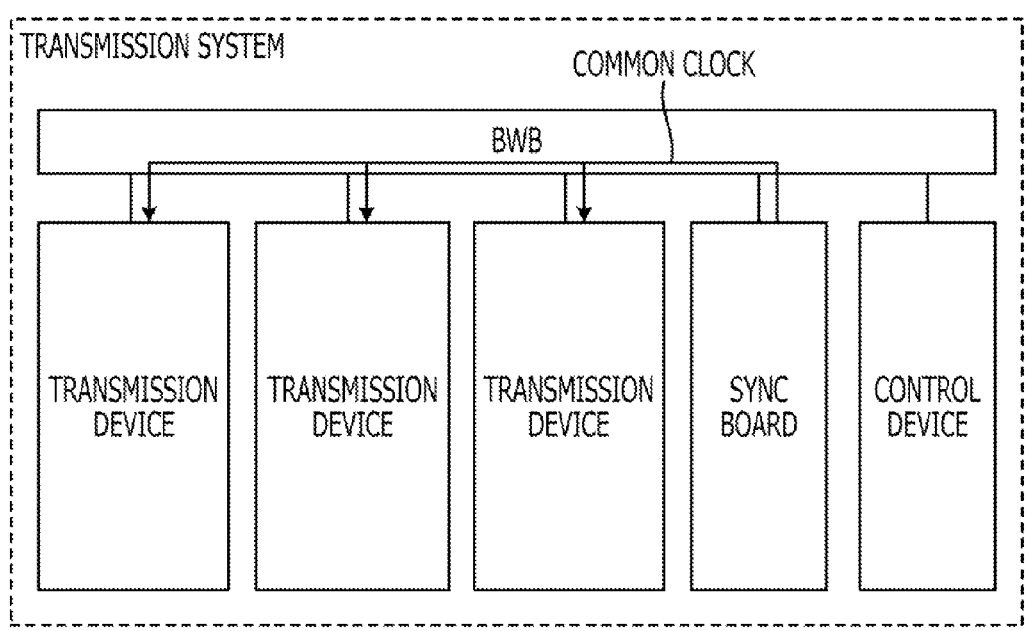
FIG. 8 is a diagram illustrating an example of the transmission system in which the SYNC board is allocated.

The clock synchronization processing performed by the transmission system 10 according to the present embodiment will be described below. FIG. 7 is an example of a procedure of clock synchronization processing performed by the transmission system 10 according to the present embodiment. FIG. 7 illustrates, for example, the procedure of the clock synchronization processing between the transmission device 300 and the transmission device 400. The clock synchronization processing between the transmission device 300 and the transmission device 500 may be performed according to the similar procedure.

As illustrated in FIG. 7, when the transmission system 10 starts (S101), the control device 100 sets the transmission device 300 as the master transmission device and sets the transmission device 400 as the slave transmission device (S102).

The SEL 307 of the transmission device 300 receives, from the control device 100, an instruction indicating that the transmission device 300 is set as the master transmission device, and selects the master clock output from the OSC 306 (S102).

The calculation circuit 309 calculates the first difference value that indicates the frequency difference value between the common clock supplied from the control device 100 and the master clock received from the SEL 307 (S103). The second memory 310 stores the first difference value calculated by the calculation circuit 309.

The transmitter 311 reports the first difference value stored in the second memory 310 to the transmission device 400 as the slave transmission device (S104).

On the other hand, the SEL 407 of the transmission device 400 receives, from the control device 100, the instruction indicating that the transmission device 400 is set as the slave transmission device, and selects the slave clock output from the VCXO 405 (S105).

The calculation circuit 409 calculates the second difference value indicating the frequency difference value between the common clock supplied from the control device 100 and the slave clock received from the SEL 407 (S106). The second memory 410 stores the second difference value calculated by the calculation circuit 409. The receiver 401 receives the first difference value reported from the transmission device 300 as the master transmission device and then transmits the first difference value to the first memory 402. The first memory 402 sequentially stores the first different value received from the receiver 401 (S107).

The differential controller 403 controls the VCXO 405, which generates the slave clock, so that the second difference value reported from the calculation circuit 409 approaches the first difference value stored in the first memory 402 (S108).

While the clock synchronization processing illustrated in FIG. 7 is being performed, the control device 100 periodically collects and monitors the first difference value and the second difference value from the transmission device 300 as the master transmission device and the transmission devices 400 and 500 as the slave transmission devices. If an error occurs in the transmission device 300 as the master transmission device, the control device 100 sets either the transmission device 400 or the transmission device 500, that is, the transmission device where the difference between the first difference value and the second difference value is the minimum, as another master transmission device. The control device 100 may perform switching setting from the slave transmission device to the master transmission device safely and quickly.

As described below, in the transmission system 10 according to the present embodiment, the transmission device 400 as the slave transmission device controls the VCXO 405, which generates the slave clock, so that the second difference value approaches the first difference value reported from the transmission device 300 as the master transmission device. According to the present embodiment, the master clock may be synchronized with the slave clock by using the existing common clock supplied from the control device 100. As a result, clock synchronization may be performed between the transmission devices without allocating the SYNC board. For example, the clock synchronization may be achieved with the accuracy of 1 ppm/1 bit.

According to the present embodiment, the transmission device 400 as the slave transmission device sequentially stores the first difference value, which is reported from the transmission device 300 as the master transmission device, in the first memory 402, and then controls the VCXO 405 so that the second difference value calculated by the transmission device 400 approaches the first difference value. Therefore, even if the report of the first difference value from the master transmission device is disrupted due to an error, the transmission device 400 as the slave transmission device may control the VCXO 405 by using the first difference value stored in the first memory 402. As a result, the transmission device 400 as the slave transmission device may maintain the clock synchronization with the other slave transmission device even if the master transmission device has an error.

According to the present embodiment, the transmission device 300 as the master transmission device reports the digital frame, which includes the first difference value and is used to transmit and receive between the master transmission device and the slave transmission device, to the transmission devices 400 and 500 as the slave transmission devices. Therefore, the transmission device 300 as the master transmission device may efficiently use the RES area as an unused area of the digital frame that is usually used to transmit and receive the data between the transmission devices.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A transmission system which couples a plurality of transmission devices to a control device, comprising:
  a first transmission device which is one of the plurality of transmission devices, the first transmission device comprising:
    a first calculation circuit which calculates a first difference value indicating a frequency difference value between a common clock supplied from the control device and a first clock as a clock used in the first transmission device; and
    a transmitter which reports the first difference value to a second transmission device other than the first transmission device,
  wherein the second transmission device comprises:
    a second calculation circuit which calculates a second difference value indicating a frequency difference value between the common clock and a second clock used in the second transmission device, and
    a frequency controller which controls an oscillator generating the second clock so that the second difference value approaches the first difference value reported from the first transmission device.

2. The transmission system according to claim 1, wherein the second transmission device further comprises:
  a first memory which sequentially stores the first difference value reported from the first transmission device, and
  wherein the frequency controller controls the oscillator so that the second difference value approaches the first difference value stored in the first memory.

3. The transmission system according to claim 1, wherein the transmitter reports a digital frame, which includes the first difference value used to transmit and receive between the first transmission device and the second transmission device, to the second transmission device.

4. A transmission device which is coupled to a control device with a first transmission device, comprising:
  a receiver which receives, from the first transmission device, a first difference value indicating a frequency difference value between a common clock, which is supplied from the control device to the transmission device and the first transmission device, and a first clock used in the first transmission device;
  a second calculation circuit which calculates a second difference value indicating the frequency difference value between the common clock and a second clock used in the transmission device; and
  a frequency controller which controls an oscillator generating the second clock so that the second difference value approaches the received first difference value.

5. A clock synchronization method which is performed in a transmission system in which a plurality of transmission devices is coupled to a control device, the method comprising:
  receiving, from a first transmission device, a first difference value indicating a frequency difference value between a common clock, which is supplied from the control device and a first clock used in the first transmission device;
  calculating, at a second transmission device, a second difference value indicating the frequency difference value between the common clock and a second clock used in the second transmission device; and
  controlling an oscillator generating the second clock so that the second difference value approaches the received first difference value.

6. The clock synchronization method according to claim 5, further comprising:
  calculating, at the first transmission device the first difference value; and
  reporting the first difference value to the second transmission device.

* * * * *